H. J. MULDER.
BROODER.
APPLICATION FILED FEB. 2, 1906.
No. 899,177.
Patented Sept. 22, 1908.
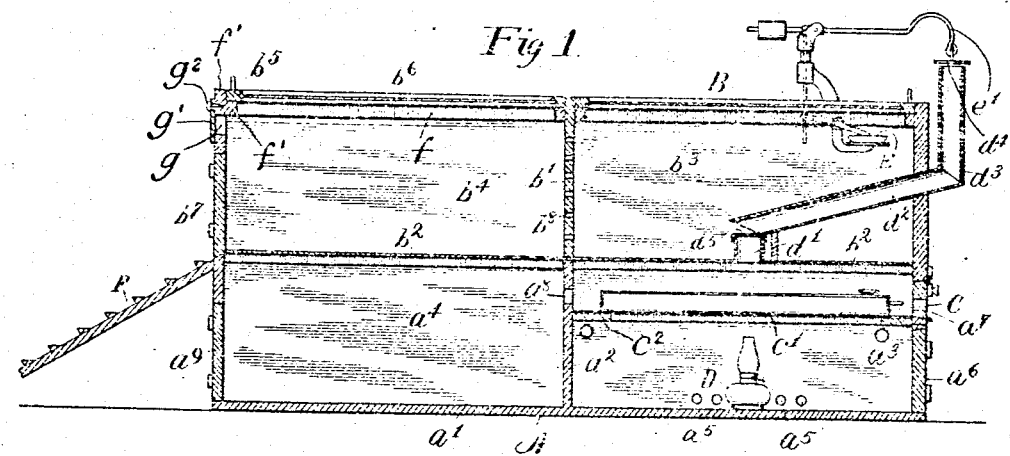
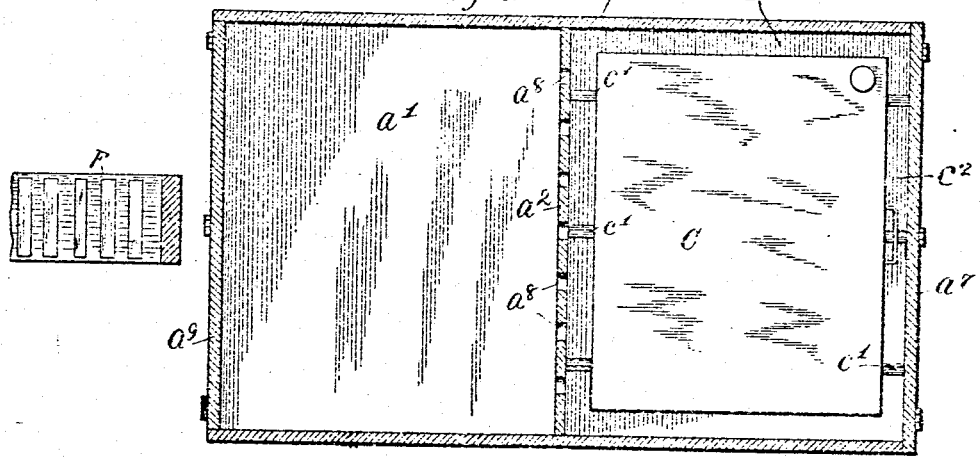
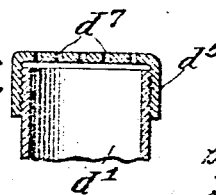
Witnesses:
John Braunwalder
Chas. F. Bauer
Inventor:
Henry J. Mulder
By
Frederick Benjamin
Att'y.

UNITED STATES PATENT OFFICE.

HENRY J. MULDER, OF ALTON, IOWA.

BROODER.

No. 899,177.   Specification of Letters Patent.   Patented Sept. 22, 1908.

Application filed February 2, 1906. Serial No. 299,226.

*To all whom it may concern:*

Be it known that I, HENRY J. MULDER, citizen of the United States, residing at Alton, in the county of Sioux and State of Iowa, have invented certain new and useful Improvements in Brooders, of which the following is a specification.

My invention relates to poultry brooders and especially to that class of brooders in which artificial heat is supplied by means of a reservoir of water kept at the required degree of temperature by means of a lamp the heat from which is regulated by a thermostatically controlled damper The chief objects of my invention are to provide a simple and efficient apparatus for the purpose in view so that its operation can be readily understood and easily managed by an unskilled person.

Further advantages lie in its superior efficiency, the maintenance of a substantially uniform temperature and the arrangement of the parts which give easy access to all portions of the structure.

In the furtherance of these and other objects and advantages I prefer to construct my improved poultry brooder in two superimposed removable sections rectangular in form, placing the warming appliance in the lower section and utilizing the upper for the young chickens. The sections are kept in relative position by cleats at the corners secured to the upper section. I prefer to cover the top of the brooder with sashes set with glass; an arrangement which gives an abundance of light, thus promoting the health of the poultry and tending to prevent the spread of diseases and the propagation of vermin which so frequently infest places where poultry are kept in numbers. This construction permits of ready inspection of every portion of the upper compartments and the sashes may be raised for purposes of ventilation or removed altogether to clean the compartments.

In the drawing, Figure 1 is a longitudinal section of my improved poultry brooder, Fig. 2 is a horizontal section of the same, and Fig. 3 is a fragmentary view, enlarged, showing the upper end of the lower section of the air pipe and cap in vertical section.

Referring to the drawing, A represents the lower section and B the upper section. The lower section A has a floor $a^1$ and is divided by a vertical partition $a^2$ into two compartments $a^3$, $a^4$. Near the upper part of the rear compartment $a^3$ is a shallow closed metal tank or reservoir C for water which is preferably constructed of galvanized iron and has a horizontal area approximating that of the compartment.

The reservoir C is supported on a frame $c^1$ and beneath the center of the tank is placed a lamp D of any ordinary style by means of which the requisite degree of heat is maintained in the water. Air for combustion in the lamp is supplied and ventilation obtained by openings $a^5$ in the sides of the compartment. A door $a^6$ in the rear wall affords access to the lamp chamber $a^3$, and a door $a^7$ extending substantially across the rear of the compartment $a^3$ permits the insertion or removal of the water reservoir C. The forward lower compartment $a^4$ receives a moderate amount of heat from the lamp chamber $a^3$ through the openings $a^8$ in the wall $a^2$. A door $a^9$ affords ingress and egress for the poultry when it is desired to use this compartment which is intended to be reserved for the chickens when they have outgrown their quarters in the upper section, hereinafter described, and do not require so great a degree of heat. The upper section B is likewise separated into two compartments by a partition $b^1$ and has a floor $b^2$. The center of the floor of the rear upper compartment $b^3$ is perforated by a pipe $d^1$ which communicates with the air space above the water reservoir in the compartment $a^3$ and affords a passage for the warm air to ascend to the said compartment $b^3$. The open end of the pipe is covered by a screw cap, or cover $d^5$, provided with perforations $d^2$. Arranged above said pipe $d^1$ at a short distance from same, is an inclined flue pipe $d^3$ which communicates with the external air through a vertical extension $d^3$. Near the upper part of the compartment $b^3$ is placed a thermostat E, which may be of any ordinary construction, the operating lever $e^1$ of which extends to the outside of the brooder where it is attached to a damper $d^4$ suspended over the pipe $d^3$. The construction and arrangement of the thermostat is such that when the temperature of the brooding chamber $b^3$ falls below a certain predetermined degree the lever $e^1$ through the medium of the damper $d^4$ will partially or wholly close the upper end of the flue $d^3$ thus forcing a greater flow of hot air to find its way into the brooding chamber through the opening $d^5$ between the pipe $d^1$ and the flue $d^3$. Conversely, when the temperature rises, the damper $d^4$ will open and the excess of hot air will escape through the flue $d^3$ to the external air.

The cover of the upper section is preferably constructed of a frame consisting of side bars $f$, supported by the side walls, and connecting bars $f^1$, $f^2$, upon which rest removable sashes $b^5$ set with glass $b^6$, and the front of the compartment $b^4$ has a door $b^7$ through which the young chickens may pass to reach an inclined runway F. I find it desirable to make the partition $b^1$, removable, so that the upper compartments $b^3$, $b^4$, may be thrown into one, thus giving a wider range and better ventilation, which will be required in warm weather, and when the outside temperature becomes low, the partition can be replaced. Openings $b^8$ in the partition $b^1$ allow a certain amount of warm air to pass from the rear compartment $b^3$ into the front compartment $b^4$. The said partition is made removable by arranging it loosely between the middle bars $f^2$, as shown in Fig. 1, said bars being placed at a sufficient distance apart to permit the partition to be slid vertically. In the upper part of the front wall of the chamber $b^3$ are provided ventilating openings $g$, supplied with shutters $g^1$, adapted to be swung laterally upon pivots $g^2$ secured in the cross bar $f^1$.

I claim:—

1. A poultry brooder including communicating upper compartments and communicating lower compartments, a removable partition between the upper compartments, transparent removable covers for the upper compartments, a water reservoir arranged beneath the floor of one of the upper compartments, means for supplying heat to the reservoir, means for carrying off the surplus heat, said means including a thermostat.

2. A poultry brooder comprising upper communicating compartments and lower communicating compartments, a water reservoir arranged in one of the lower compartments, a flue leading from said lower compartment and communicating with an upper compartment, a second flue arranged in said upper compartment and opening into the atmosphere at one end and communicating with the first named flue, thermostatic means controlling the said second flue and means for heating the water in said reservoir.

In testimony whereof I affix my signature in presence of two witnesses.

HENRY J. MULDER.

Witnesses:
HENRY GROTENHUIS,
ALBERT JANSEN.